United States Patent
Alshahrani

(10) Patent No.: US 10,954,127 B2
(45) Date of Patent: Mar. 23, 2021

(54) ADVANCED HEAT INTEGRATION IN SULFUR RECOVERY UNIT—SAFARCLAUS

(71) Applicant: Saudi Arabian Oil Company, Dhahran (SA)

(72) Inventor: Yazeed Safar Alshahrani, Alkhobar (SA)

(73) Assignee: SAUDI ARABIAN OIL COMPANY

( * ) Notice: Subject to any disclaimer, the term of this patent is extended or adjusted under 35 U.S.C. 154(b) by 0 days.

(21) Appl. No.: 16/848,593

(22) Filed: Apr. 14, 2020

(65) Prior Publication Data

US 2020/0239309 A1    Jul. 30, 2020

Related U.S. Application Data

(63) Continuation of application No. 16/443,337, filed on Jun. 17, 2019, now Pat. No. 10,676,356, which is a continuation-in-part of application No. 15/901,522, filed on Feb. 21, 2018, now Pat. No. 10,358,349.

(51) Int. Cl.
    *C01B 17/04* (2006.01)
(52) U.S. Cl.
    CPC ........ *C01B 17/0417* (2013.01); *C01B 17/043* (2013.01); *C01B 17/0452* (2013.01)
(58) Field of Classification Search
    CPC . C01B 17/04; C01B 17/0404; C01B 17/0413; C01B 17/0417; F27D 17/00; F27D 17/004
    See application file for complete search history.

(56) References Cited

U.S. PATENT DOCUMENTS

| | | | |
|---|---|---|---|
| 4,042,340 A * | 8/1977 | Palm | C01B 17/0404 422/198 |
| 4,391,791 A | 7/1983 | Palm et al. | |
| 4,511,549 A | 4/1985 | Diemer et al. | |
| 4,756,900 A | 7/1988 | Pendergraft et al. | |
| 5,397,556 A | 3/1995 | Towler et al. | |

(Continued)

FOREIGN PATENT DOCUMENTS

| | | |
|---|---|---|
| EP | 0199507 | 10/1986 |
| EP | 0328820 A2 | 8/1989 |

OTHER PUBLICATIONS

The International Search Report and Written Opinion for related PCT application PCT/US2019/018873 dated May 6, 2019. (SA5764).

*Primary Examiner* — Timothy C Vanoy
(74) *Attorney, Agent, or Firm* — Bracewell LLP; Constance R. Rhebergen

(57) ABSTRACT

A method for heat integration in a sulfur recovery unit, the method comprising the steps of reacting the acid gas stream and the air stream in the reaction furnace to produce a reaction effluent, where the reaction effluent comprises elemental sulfur, reducing the temperature of the reaction effluent in the heating extension to produce an effluent stream, reducing the temperature of the reaction effluent in the waste heat boiler to produce a cooled effluent stream, reducing the temperature of the cooled effluent in the sulfur condenser to produce a liquid sulfur stream and a cooled gases stream, where the liquid sulfur stream comprises the elemental sulfur, and increasing a temperature of the cooled gases stream to produce a hot gases stream, where the heating extension is configured to capture heat from the reaction effluent and release the heat to the cooled gases stream.

9 Claims, 6 Drawing Sheets

(56) References Cited

U.S. PATENT DOCUMENTS

| | | |
|---|---|---|
| 7,722,852 B2 | 5/2010 | Rameshni |
| 10,358,349 B1 * | 7/2019 | Alshahrani .............. B01J 12/02 |
| 10,676,356 B2 * | 6/2020 | Alshahrani ......... C01B 17/0452 |
| 2005/0238552 A1 * | 10/2005 | Thielert .............. C01B 17/0417 422/187 |
| 2014/0017162 A1 * | 1/2014 | Kamisuki .............. B01J 8/0419 423/576.2 |

* cited by examiner

ADVANCED HEAT INTEGRATION IN SULFUR RECOVERY UNIT—SAFARCLAUS

CROSS-REFERENCE TO RELATED APPLICATIONS

This application is a continuation application of U.S. patent application Ser. No. 16/443,337 filed on Jun. 17, 2019, which is a continuation-in-part of and claims priority from U.S. patent application Ser. No. 15/901,522 filed on Feb. 21, 2018, all of which are incorporated herein by reference in their entirety.

TECHNICAL FIELD

Disclosed are systems and methods for recovering heat energy. Specifically, disclosed are systems and methods for recovering heat energy in a sulfur recovery process.

BACKGROUND

A conventional Claus process consists of a thermal unit and a catalytic unit. The thermal unit consists of a reaction furnace, a waste heat boiler, and a sulfur condenser. In the thermal unit hydrogen sulfide and oxygen react to produce elemental sulfur and sulfur dioxide. The elemental sulfur is removed in the sulfur condenser. The catalytic unit includes a series of catalytic reactors, where each catalytic reactor is preceded by a re-heater and followed by a condenser. In the catalytic reactors elemental sulfur is produced by the reaction among hydrogen sulfide, sulfur dioxide, and oxygen. The re-heater increases the temperature to the reaction temperature in the catalytic reactors. The condenser condenses the elemental sulfur to produce a liquid sulfur stream. The re-heater is a direct-fired reheater that burns fuel gas to increase the process stream temperature.

SUMMARY

Disclosed are systems and methods for recovering heat energy. Specifically, disclosed are systems and methods for recovering heat energy in a sulfur recovery process.

In a first aspect, a method for heat integration in a sulfur recovery unit is provided. The method includes the steps of introducing an acid gas stream to a reaction furnace, where the acid gas stream includes hydrogen sulfide, introducing an air stream to the reaction furnace, where the air stream includes oxygen, reacting the acid gas stream and the air stream in the reaction furnace to produce a reaction effluent that includes elemental sulfur, where the hydrogen sulfide and oxygen react to produce the elemental sulfur, introducing the reaction effluent to a heating extension, reducing the temperature of the reaction effluent in the heating extension to produce a cooled effluent stream, introducing the cooled effluent to a sulfur condenser, reducing the temperature of the cooled effluent in the sulfur condenser to produce a liquid sulfur stream and a cooled gases stream, where the liquid sulfur stream includes the elemental sulfur, introducing the cooled gases stream to the heating extension, and increasing a temperature of the cooled gases stream to produce a hot gases stream, where the heating extension is configured to capture heat from the reaction effluent and release the heat to the cooled gases stream. The method further includes the steps of introducing the hot gases stream to a first catalytic converter, producing a first catalytic effluent in the first catalytic converter, where the first catalytic effluent includes elemental sulfur, where the first catalytic converter includes a catalyst, introducing the first catalytic effluent to a first effluent condenser, reducing the temperature of the first catalytic effluent in the first effluent condenser to produce a sulfur stream and a first non-condensed gases stream, where the sulfur stream includes the elemental sulfur, introducing the first non-condensed gases stream to the heating extension, increasing a temperature of the first non-condensed gases stream to produce a first hot non-condensables stream, introducing the first hot non-condensables stream to a second catalytic converter, producing a second catalytic effluent in the second catalytic converter, where the second catalytic effluent includes elemental sulfur, where the second catalytic converter includes a catalyst, introducing the second catalytic effluent to a second effluent condenser, reducing the temperature of the second catalytic effluent in the second effluent condenser to produce a sulfur effluent and a second non-condensed gases stream, where the sulfur effluent includes the elemental sulfur, introducing the second non-condensed gases stream to the heating extension, increasing a temperature of the second non-condensed gases stream to produce a second hot non-condensables stream, introducing the second hot non-condensables stream to a third catalytic converter, producing a third catalytic effluent in the third catalytic converter, where the third catalytic effluent includes elemental sulfur, where the third catalytic converter includes a catalyst, introducing the third catalytic effluent to a third effluent condenser, and reducing the temperature of the third catalytic effluent in the third effluent condenser to produce a sulfur discharge and a discharge stream, where the sulfur effluent includes the elemental sulfur.

In certain aspects, the method further includes the steps of introducing the hot gases stream to a catalytic stage, and producing a sulfur stream and a discharge gases stream in the catalytic stage, where the sulfur stream includes elemental sulfur. In certain aspects, the method further includes the steps of introducing a pre-feed acid gas to an acid gas preheater, and increasing the temperature of the pre-feed acid gas to produce the acid gas stream. In certain aspects, the method further includes the steps of introducing a pre-feed air to an air pre-heater, and increasing the temperature of the pre-feed air to produce the air stream.

In a second aspect, a method for heat integration in a sulfur recovery unit is provided. The method includes the steps of introducing an acid gas stream to a reaction furnace, where the acid gas stream includes hydrogen sulfide, introducing an air stream to the reaction furnace, where the air stream includes oxygen, reacting the acid gas stream and the air stream in the reaction furnace to produce a reaction effluent, where the reaction effluent includes elemental sulfur, where the hydrogen sulfide and oxygen react to produce the elemental sulfur, introducing the reaction effluent to a heating extension, reducing the temperature of the reaction effluent in the heating extension to produce a cooled effluent stream, introducing the cooled effluent to a sulfur condenser, reducing the temperature of the cooled effluent in the sulfur condenser to produce a liquid sulfur stream and a cooled gases stream, where the liquid sulfur stream includes the elemental sulfur, introducing the cooled gases stream to the heating extension, increasing a temperature of the cooled gases stream to produce a hot gases stream, where the heating extension is configured to capture heat from the reaction effluent and release the heat to the cooled gases stream. The method further includes the steps of introducing the hot gases stream to a first catalytic converter, producing a first catalytic effluent in the first catalytic converter, where the first catalytic effluent includes elemental sulfur, where the first catalytic converter includes a catalyst, introducing the first catalytic effluent to a first effluent condenser, reducing the temperature of the first catalytic effluent in the first effluent condenser to produce a sulfur stream and a first non-condensed gases stream, where the sulfur stream includes the elemental sulfur, introducing the first non-condensed gases stream to the heating extension, increasing a temperature of the first non-condensed gases stream to produce a first hot non-condensables stream, introducing the first hot non-condensables stream to a second catalytic converter, producing a second catalytic effluent in the second catalytic converter, where the second catalytic effluent includes elemental sulfur, where the second catalytic converter includes a catalyst, introducing the second catalytic effluent to a second effluent condenser, and reducing the temperature of the second catalytic effluent in the second effluent condenser to produce a sulfur effluent and a discharge stream, where the sulfur effluent includes the elemental sulfur.

In a third aspect, a method for heat integration in a sulfur recovery unit is provided. The method includes the steps of introducing an acid gas stream to a reaction furnace, where the acid gas stream includes hydrogen sulfide, introducing an air stream to the reaction furnace, where the air stream includes oxygen, reacting the acid gas stream and the air stream in the reaction furnace to produce a reaction effluent, where the reaction effluent includes elemental sulfur, where the hydrogen sulfide and oxygen react to produce the elemental sulfur, introducing the reaction effluent to a heating extension, reducing the temperature of the reaction effluent in the heating extension to produce an effluent stream, introducing the effluent stream to a waste heat boiler, reducing the temperature of the reaction effluent in the waste heat boiler to produce a cooled effluent stream, introducing the cooled effluent to a sulfur condenser, reducing the temperature of the cooled effluent in the sulfur condenser to produce a liquid sulfur stream and a cooled gases stream, where the liquid sulfur stream includes the elemental sulfur, introducing the cooled gases stream to the heating extension, increasing a temperature of the cooled gases stream to produce a hot gases stream, where the heating extension is configured to capture heat from the reaction effluent and release the heat to the cooled gases stream. The method further includes the steps of introducing the hot gases stream to a first catalytic converter, producing a first catalytic effluent in the first catalytic converter, where the first catalytic effluent includes elemental sulfur, where the first catalytic converter includes a catalyst, introducing the first catalytic effluent to a first effluent condenser, reducing the temperature of the first catalytic effluent in the first effluent condenser to produce a sulfur stream and a first non-condensed gases stream, where the sulfur stream includes the elemental sulfur, introducing the first non-condensed gases stream to the heating extension, increasing a temperature of the first non-condensed gases stream to produce a first hot non-condensables stream, introducing the first hot non-condensables stream to a second catalytic converter, producing a second catalytic effluent in the second catalytic converter, where the second catalytic effluent includes elemental sulfur, where the second catalytic converter includes a catalyst, introducing the second catalytic effluent to a second effluent condenser, reducing the temperature of the second catalytic effluent in the second effluent condenser to produce a sulfur effluent and a second non-condensed gases stream, where the sulfur effluent includes the elemental sulfur, introducing the second non-condensed gases stream to the heating extension, increasing a temperature of the second non-condensed gases stream to produce a second hot non-condensables stream, introducing the second hot non-condensables stream to a third catalytic converter, producing a third catalytic effluent in the third catalytic converter, where the third catalytic effluent includes elemental sulfur, where the third catalytic converter includes a catalyst, introducing the third catalytic effluent to a third effluent condenser, and reducing the temperature of the third catalytic effluent in the third effluent condenser to produce a sulfur discharge and a discharge stream, where the sulfur effluent includes the elemental sulfur.

In a fourth aspect, a method for heat integration in a sulfur recovery unit is provided. The method includes the steps of introducing an acid gas stream to a reaction furnace, where the acid gas stream includes hydrogen sulfide, introducing an air stream to the reaction furnace, where the air stream includes oxygen, reacting the acid gas stream and the air stream in the reaction furnace to produce a reaction effluent, where the reaction effluent includes elemental sulfur, where the hydrogen sulfide and oxygen react to produce the elemental sulfur, introducing the reaction effluent to a heating extension, reducing the temperature of the reaction effluent in the heating extension to produce an effluent stream, introducing the effluent stream to a waste heat boiler, reducing the temperature of the reaction effluent in the waste heat boiler to produce a cooled effluent stream, introducing the cooled effluent to a sulfur condenser, reducing the temperature of the cooled effluent in the sulfur condenser to produce a liquid sulfur stream and a cooled gases stream, where the liquid sulfur stream includes the elemental sulfur, introducing the cooled gases stream to the heating extension, increasing a temperature of the cooled gases stream to produce a hot gases stream, where the heating extension is configured to capture heat from the reaction effluent and release the heat to the cooled gases stream. The method further includes the steps of introducing the hot gases stream to a first catalytic converter, producing a first catalytic effluent in the first catalytic converter, where the first catalytic effluent includes elemental sulfur, where the first catalytic converter includes a catalyst, introducing the first catalytic effluent to a first effluent condenser, reducing the temperature of the first catalytic effluent in the first effluent condenser to produce a sulfur stream and a first non-condensed gases stream, where the sulfur stream includes the elemental sulfur, introducing the first non-condensed gases stream to the heating extension, increasing a temperature of the first non-condensed gases stream to produce a first hot non-condensables stream, introducing the first hot non-condensables stream to a second catalytic converter, producing a second catalytic effluent in the second catalytic converter, where the second catalytic effluent includes elemental sulfur, where the second catalytic converter includes a catalyst, introducing the second catalytic effluent to a second effluent condenser, reducing the temperature of the second catalytic effluent in the second effluent condenser to produce a sulfur effluent and a discharge stream, where the sulfur effluent includes the elemental sulfur.

In a fifth aspect, a system of heat integration in a sulfur recovery unit is provided. The system includes a reaction furnace configured to allow a reaction between an acid gas stream and an air stream to produce a reaction effluent that includes hydrogen sulfide, a heating extension fluidly connected with the reaction furnace, where the heating extension is configured to capture heat from the reaction effluent to produce an effluent stream, where the captured heat is released to a cooled gases stream to produce a hot gases stream, a waste heat boiler fluidly connected to the heating extension, the waste heat boiler configured to reduce a temperature of the effluent stream to produce a cooled effluent, and a sulfur condenser fluidly connected to the waste heat boiler, the sulfur condenser configured to reduce the temperature of the cooled effluent to produce a liquid sulfur stream and the cooled gases stream, where the liquid sulfur stream includes elemental sulfur.

In certain aspects, the system further includes a catalytic stage fluidly connected to the sulfur condenser, the catalytic stage configured to convert the hot gases stream to produce a sulfur stream and a discharge stream. In certain aspects, the system further includes an acid gas preheater configured to increase the temperature of a pre-feed acid gas to produce the acid gas stream. In certain aspects, the system further includes an air preheater configured to increase the temperature of a pre-feed air to produce the air stream.

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

DETAILED DESCRIPTION

While the scope of the apparatus and method will be described with several embodiments, it is understood that one of ordinary skill in the relevant art will appreciate that many examples, variations and alterations to the apparatus and methods described here are within the scope and spirit of the embodiments.

Accordingly, the embodiments described are set forth without any loss of generality, and without imposing limitations, on the embodiments. Those of skill in the art understand that the scope includes all possible combinations and uses of particular features described in the specification.

Provided are systems and methods for heat integration processes in a sulfur recovery unit. Advantageously, the heat integration process can reduce the size of the waste heat boiler following the reaction furnace while maintaining temperatures in the reaction furnace. Advantageously, the heat integration process eliminates the need for a stand-alone re-heater between the sulfur condenser and the catalytic stage. Advantageously, eliminating the re-heaters reduces the fuel gas consumption and minimizes the complexity of the system by reducing the number of process units. Advantageously, integrating the heating extension with the streams in the catalytic stages can minimize the nitrogen oxides and other emissions created from burinng fuel gases.

Figure 1:
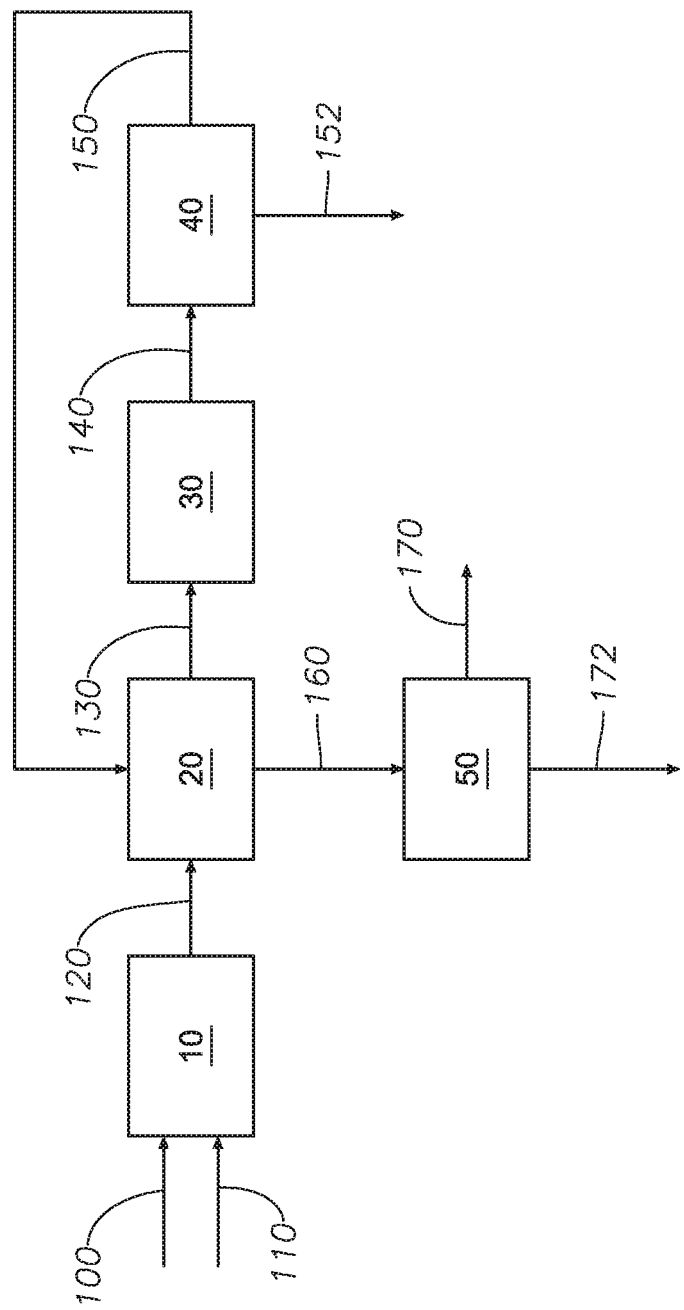
FIG. 1 is a process flow diagram of an embodiment of a heat integration process.

Referring to FIG. 1, acid gas stream 100 and air stream 110 are introduced to reaction furnace 10. Reaction furnace 10 can be a fired furnace capable of reaching temperatures of 2200 degrees Fahrenheit (deg F.) (1204 deg Celsius (deg C.)) to support combustion reactions of the components of acid gas stream 100. The pressure in reaction furnace 10 can be greater than 6 pounds per square inch gauge (psig). The residence time in reaction furnace 10 can be based on the size of the reaction furnace, scale of the sulfur recovery unit, concentration of hydrogen sulfide, and other parameters. The residence time can be designed to allow the reaction of hydrogen sulfide into sulfur dioxide and the subsequent reaction between hydrogen sulfide and sulfur dioxide to produce elemental sulfur.

Acid gas stream 100 can be a gas stream that contains hydrogen sulfide. Acid gas stream 100 can include hydrogen sulfide, carbon dioxide, and combinations of the same.

Air stream 110 can be a gas stream containing oxygen. Air stream 110 can contain air, oxygen-enriched air, pure oxygen, and combinations of the same.

In reaction furnace 10 the hydrogen sulfide in acid gas stream 100 and oxygen in air stream 110 react to produce elemental sulfur. The elemental sulfur can exit reaction furnace 10 in reaction effluent 120. Reaction effluent 120 can include elemental sulfur, hydrogen sulfide, sulfur dioxide, and other gases.

Reaction effluent 120 can pass through heating extension 20. Heating extension 20 can be a unit designed to exchange heat between two process streams without mixing the components of the two process streams. Heating extension 20 can transfer heat energy from reaction effluent 120 to cooled gases stream 150. Heating extension 20 can be physically and fluidly connected to reaction furnace 10.

In at least one embodiment, heating extension 20 is a system of heat exchange tubing arranged proximate to the inner wall of the reaction furnace, where cooled gases stream 150 passes through the heat exchanging tubing without mixing or contacting reaction effluent 120. The size and number of heat exchange tubes can be designed based on the process flow rates, the amount of heat energy that needs to be transferred to cooled gases stream 150 and the size of reaction furnace 10. In embodiments where heating extension 20 is located physically inside reaction furnace 10, heating extension 20 can be designed such that reaction effluent 120 can flow around the heat exchange tubing while still allowing gas mixing in the reaction furnace.

In at least one embodiment, heating extension 20 can be a heat exchanger physically connected to reaction furnace 10. The heat exchanger can be designed based on the process flow rates and the amount of heat energy that needs to be transferred to cooled gases stream 150.

Heating extension 20 can reduce the temperature of reaction effluent 120 to produce effluent stream 130. The amount of heat energy transferred from reaction effluent 120 can be designed based on the energy needs of the overall sulfur recovery unit. In at least one embodiment, the temperature of effluent stream 130 is less than 1500 deg F. (815 deg C.).

Effluent stream 130 can be introduced to waste heat boiler 30. Waste heat boiler 30 can be physically and fluidly connected to heating extension 20. Waste heat boiler 30 can reduce the temperature of effluent stream 130 to produce cooled effluent 140. Waste heat boiler 30 can be any type of heat exchanger capable of removing heat energy from effluent stream 130. In at least one embodiment, waste heat boiler 130 is a boiler designed to transfer heat energy from effluent stream 130 to a water stream to produce steam. In at least one embodiment, the steam produced in waste heat boiler 30 is at a temperature of 450 deg F. (204 deg C.) and a pressure of 400 psig. Due to the combination of heating extension 20 and waste heat boiler 30, waste heat boiler 30 can have a smaller volume than a waste heat boiler in a conventional Claus process.

Cooled effluent 140 can be introduced to sulfur condenser 40. Sulfur condenser 40 can reduce the temperature of cooled effluent 140 to produce liquid sulfur stream 152 and cooled gases stream 150. Liquid sulfur stream 152 can include the elemental sulfur produced in reaction furnace 10. Cooled gases stream 150 can include those gases that do not condense in sulfur condenser 40. Cooled gases stream 150 can have a temperature of equal to or less than 250 deg F. (121 deg C.).

Cooled gases stream 150 can be introduced to heating extension 20. The temperature of cooled gases stream 150 can be increased in heating extension 20 to produce hot gases stream 160. The temperature of hot gases stream 160 can be between 300 deg Fahrenheit (148 deg C.) and 450 deg F. (232 deg C.), alternately between 350 deg F. (176 deg C.) and 400 deg F (204 deg C.), and alternately between 365 deg F. (185 deg C.) and 385 deg F. (196 deg C.). The temperature of hot gases stream 160 can be selected based on the operating conditions desired in catalytic stage 50, where the temperature can be selected to optimize the reactions and recovery of sulfur occurring in catalytic stage 50.

Hot gases stream 160 can be introduced to catalytic stage 50. Catalytic stage 50 can produce sulfur stream 172 and discharge stream 170. Sulfur stream 172 can include elemental sulfur. Discharge stream 170 can include sulfur dioxide, hydrogen sulfide, air, and combinations of the same. Catalytic stage 50 can include one or more catalytic converters with each catalytic converter followed by a condenser. The catalytic converters can react components in hot gases stream 160 to produce elemental sulfur. The elemental sulfur can be condensed in the condensers to produce a sulfur stream.

Figure 2:
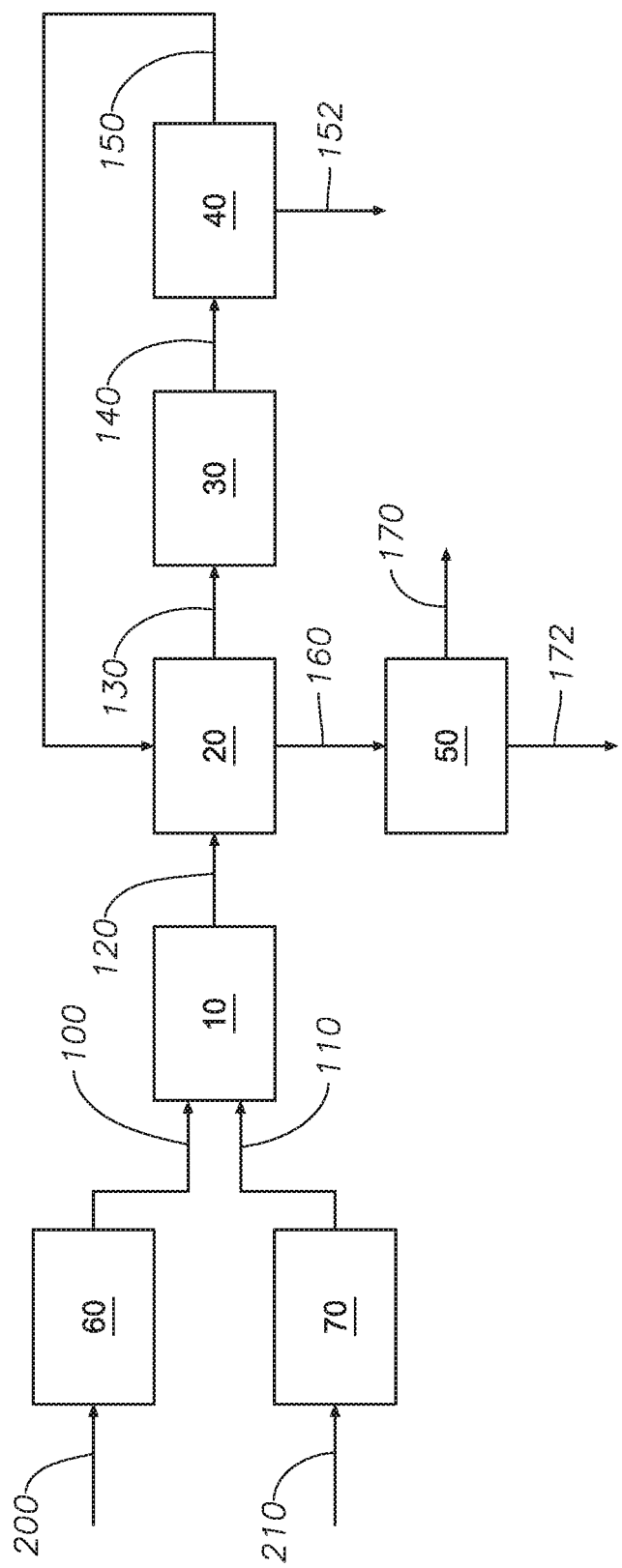
FIG. 2 is a process flow diagram of an embodiment of a heat integration process.

Referring to FIG. 2, pre-feed acid gas 200 can be introduced to acid gas preheater 60. Acid gas preheater 60 is a heating unit capable of achieving temperatures in excess of 1000 deg F. (537 deg C.) while exchanging heat between two process streams without mixing the components of the two process streams. The temperature of pre-feed acid gas 200 can be increased to produce acid gas stream 100. In at least one embodiment, the temperature of acid gas stream 100 is 500 deg F. (260 deg C.). Pre-feed air 210 can be introduced to air preheater 70. Air preheater 70 is a heating unit capable of achieving temperatures in excess of 1000 deg F. (537 deg C.) while exchanging heat between two process streams without mixing the components of the two process streams. The temperature of pre-feed air can be increased to produce air stream 110. In at least one embodiment, the temperature of air stream 110 is 700 deg F. (371 deg C.).

Figure 3:
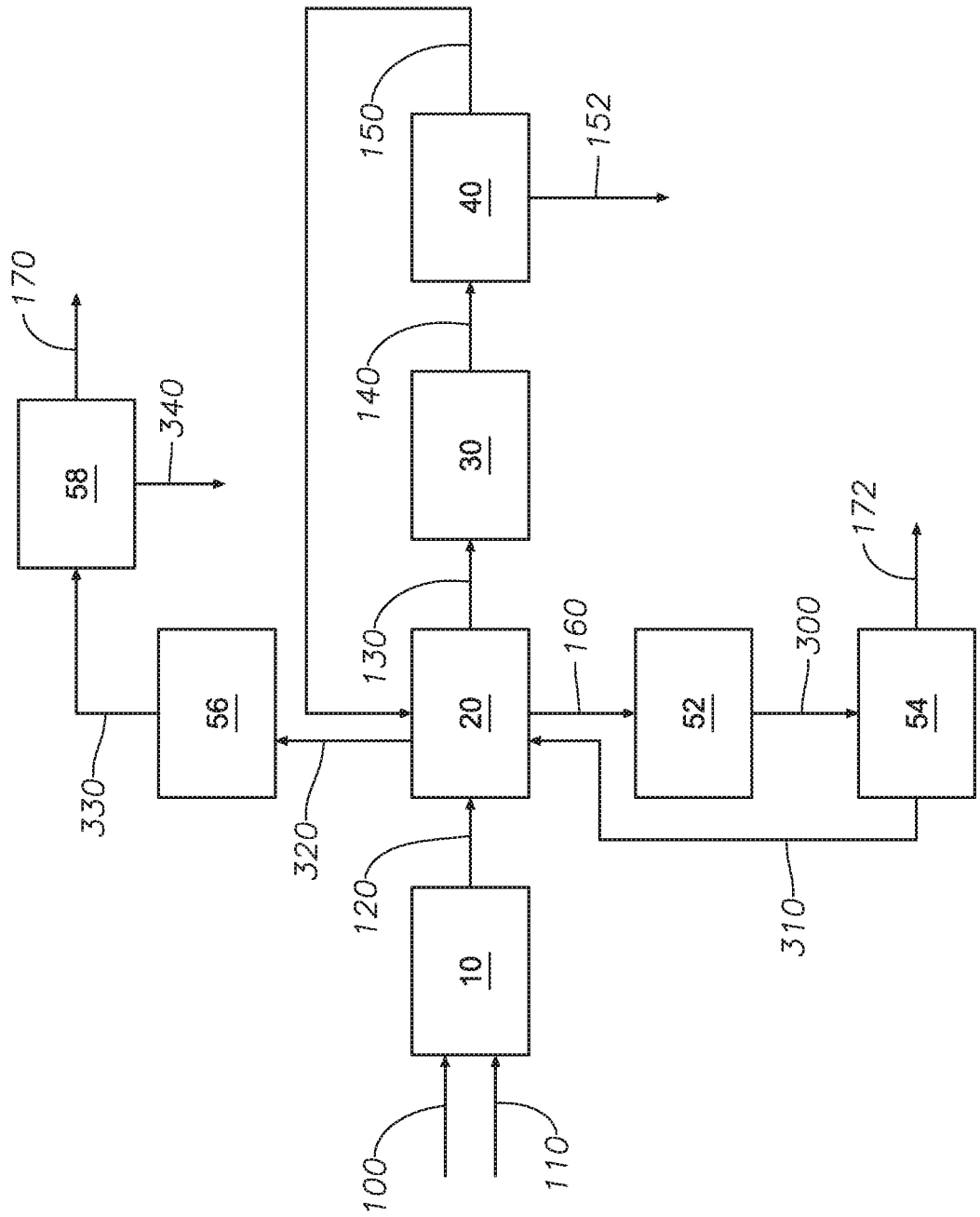
FIG. 3 is a process flow diagram of an embodiment of a heat integration process.

Referring to FIG. 3, with reference to FIG. 1, an alternate embodiment of the heat integration process is provided. Hot gases stream 160 is introduced to first catalytic converter 52. The temperature of hot gases stream 160 can be selected based on the operating conditions desired in first catalytic converter 52. First catalytic converter 52 can catalyze reactions of hydrogen sulfide, sulfur dioxide, and other sulfur containing contaminants to produce elemental sulfur. First catalytic converter 52 can include a catalyst. First catalytic converter 52 can produce first catalytic effluent 300. First catalytic effluent 300 can include elemental sulfur. First catalytic effluent 300 can be introduced to first effluent condenser 54.

First effluent condenser 54 can be any type of heat exchanger capable of reducing the temperature of a gases stream to allow for condensing of one component in the gases stream. First effluent condenser 54 can reduce the temperature of first catalytic effluent 300 to produce sulfur stream 172 and first non-condensed gases stream 310. Sulfur stream 172 can include the elemental sulfur produced in first catalytic converter 52. First non-condensed gases stream 310 can have a temperature of equal to or less than 250 deg F. (121 deg C.). First non-condensed gases stream 310 can be introduced to heating extension 20.

The temperature of first non-condensed gases stream 310 can be increased in heating extension 20 to produce first hot non-condensables stream 320. The temperature of first hot non-condensables stream 320 can be between 300 deg F. (148 deg C.) and 450 deg F. (232 deg C.), alternately between 350 deg F. (176 deg C.) and 400 deg F. (204 deg C.), and alternately between 365 deg F. (185 deg C.) and 385 deg F. (196 deg C.). The temperature of first hot non-condensables stream 320 can be selected based on the operating conditions desired in second catalytic converter 56, where the temperature can be selected to optimize the reactions and recovery of sulfur occurring in second catalytic converter 56. First hot non-condensables stream 320 can be introduced to second catalytic converter 56.

Second catalytic converter 56 can catalyze reactions of hydrogen sulfide, sulfur dioxide, and other sulfur containing contaminants to produce elemental sulfur. Second catalytic converter 56 can include a catalyst. Second catalytic converter 56 can produce second catalytic effluent 330. Second catalytic effluent 330 can include elemental sulfur. Second catalytic effluent 330 can be introduced to second effluent condenser 58.

Second effluent condenser 58 can be any type of heat exchanger capable of reducing the temperature of a gases stream to allow for condensing of one component in the gases stream. Second effluent condenser 58 can reduce the temperature of second catalytic effluent 330 to produce sulfur effluent 340 and discharge stream 170. Sulfur effluent 340 can include the elemental sulfur produced in second catalytic converter 56.

Figure 4:
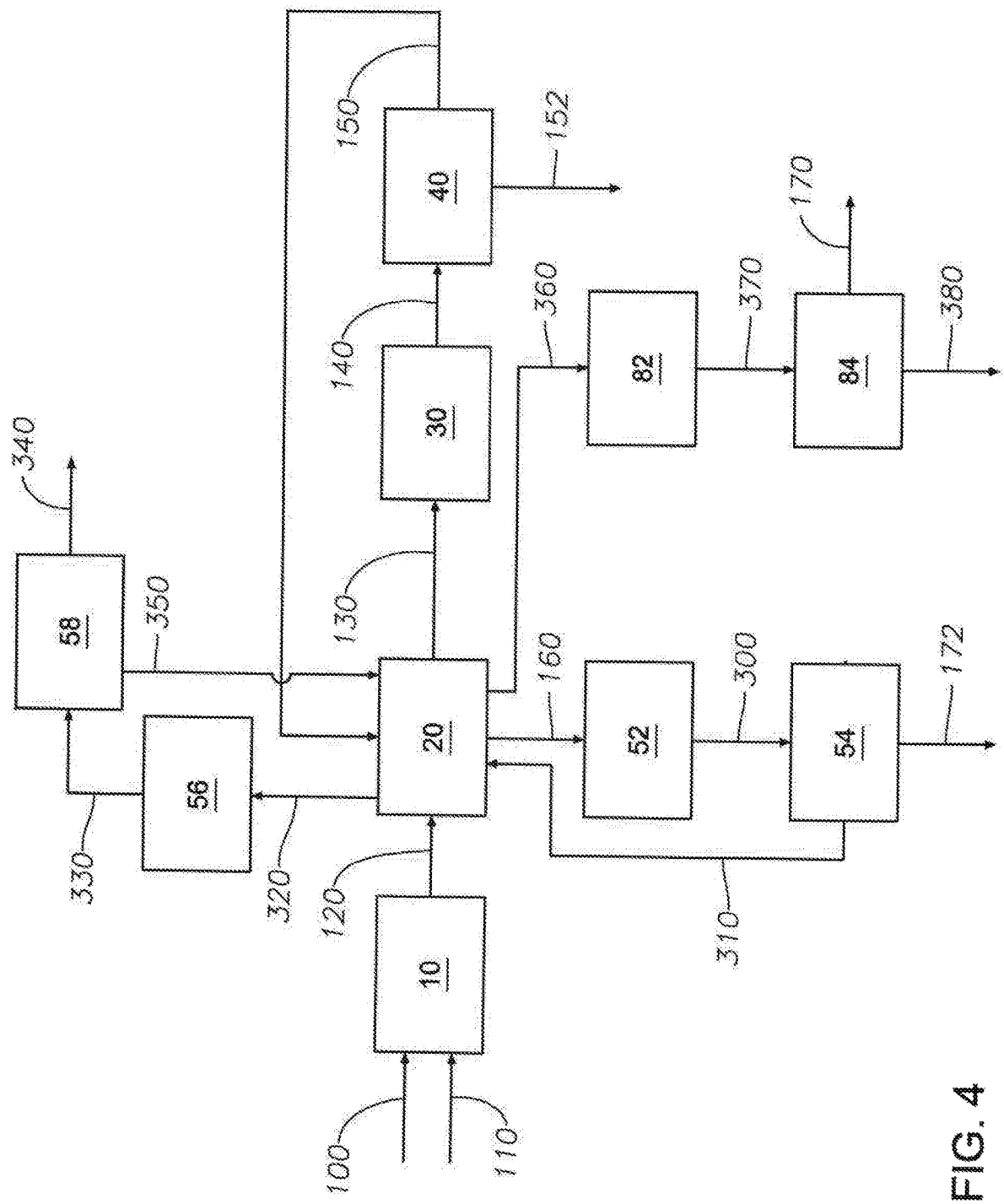
FIG. 4 is a process flow diagram of an embodiment of a heat integration process.

Referring to FIG. 4, reference to FIG. 1 and FIG. 3, an alternate embodiment of the heat integration process is provided.

Second effluent condenser 58 can reduce the temperature of second catalytic effluent 330 to produce sulfur effluent 340 and second non-condensed gases stream 350. Second non-condensed gases stream 350 can have a temperature of equal to or less than 250 deg F. (121 deg C.).

Second non-condensed gases stream 350 can be introduced to heating extension 20. The temperature of second non-condensed gases stream 350 can be increased in heating extension 20 to produce second hot non-condensables stream 360. The temperature of second hot non-condensables stream 360 can be between 300 deg F. (148 deg C.) and 450 deg F. (232 deg C.), alternately between 350 deg F. (176 deg C.) and 400 deg F. (204 deg C.), and alternately between 365 deg F. (185 deg C.) and 385 deg F. (196 deg C.). The temperature of second hot non-condensables stream 360 can be selected based on the operating conditions desired in third catalytic converter 82, where the temperature can be selected to optimize the reactions and recovery of sulfur occurring in third catalytic converter 82. Second hot non-condensables stream 360 can be introduced to third catalytic converter 82.

Third catalytic converter 82 can catalyze reactions of hydrogen sulfide, sulfur dioxide, and other sulfur containing contaminants to produce elemental sulfur. Third catalytic converter 82 can include a catalyst. Third catalytic converter 82 can produce third catalytic effluent 370. Third catalytic effluent 370 can include elemental sulfur. Third catalytic effluent 370 can be introduced to third effluent condenser 84.

Third effluent condenser 84 can be any type of heat exchanger capable of reducing the temperature of a gases stream to allow for condensing of one component in the gases stream. Third effluent condenser 84 can reduce the temperature of third catalytic effluent 370 to produce sulfur discharge 380 and discharge stream 170. Sulfur discharge 380 can include the elemental sulfur produced in third catalytic converter 82.

Figure 5:
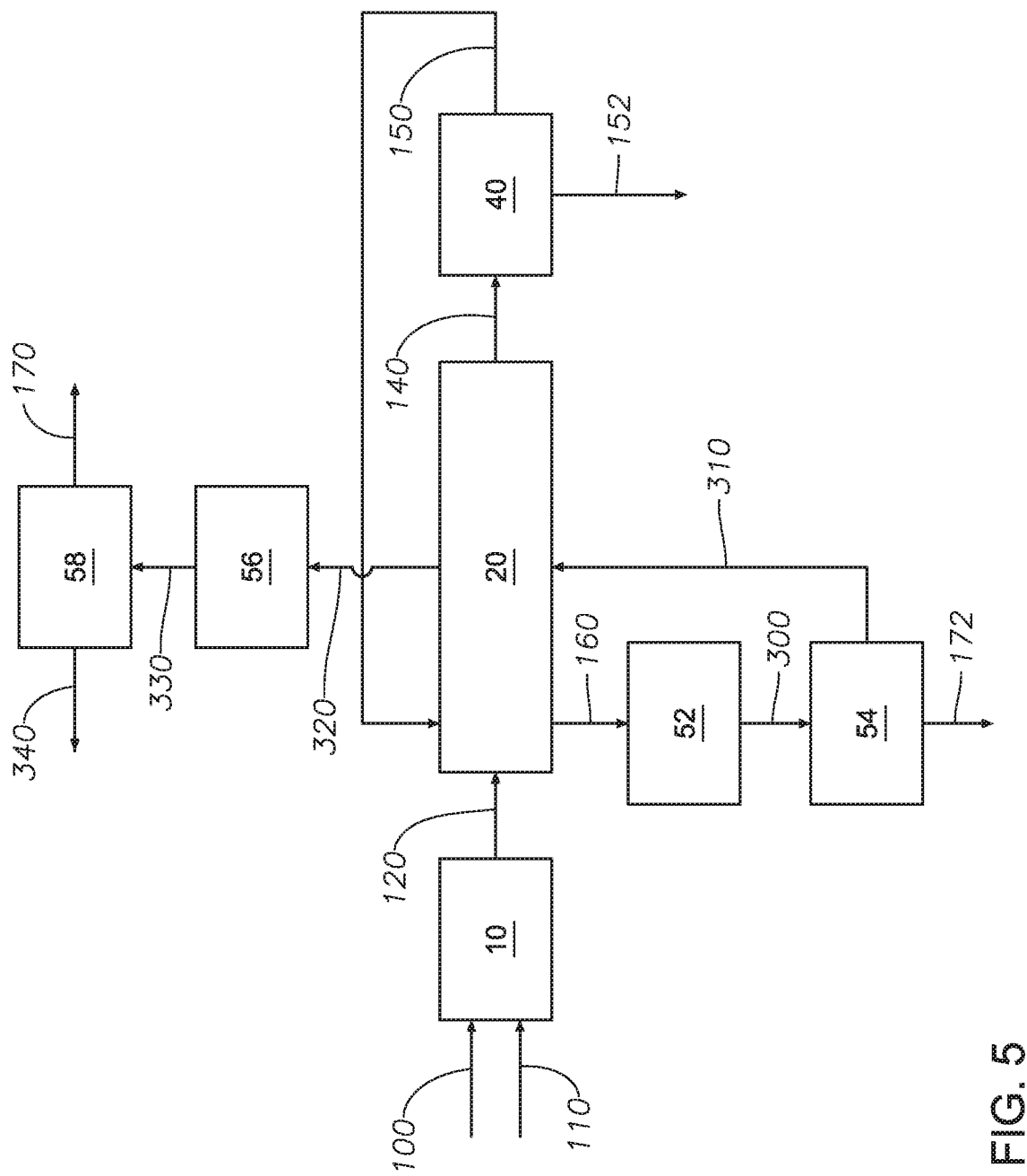
FIG. 5 is a process flow diagram of an embodiment of a heat integration process.

Referring to FIG. 5, with reference to FIG. 1 and FIG. 3, an alternate embodiment of the heat integration process is provided. In the embodiment described with reference to FIG. 5, the waste heat boiler is removed, where enough heat is removed in heating extension 20 to produce cooled effluent 140. Sufficient heat can be removed from reaction effluent 120 to increase the temperature of cooled gases stream 150 to produce hot gases stream 160 and to increase the temperature of first non-condensed gases stream 310 to produce first hot non-condensables stream 320.

Figure 6:
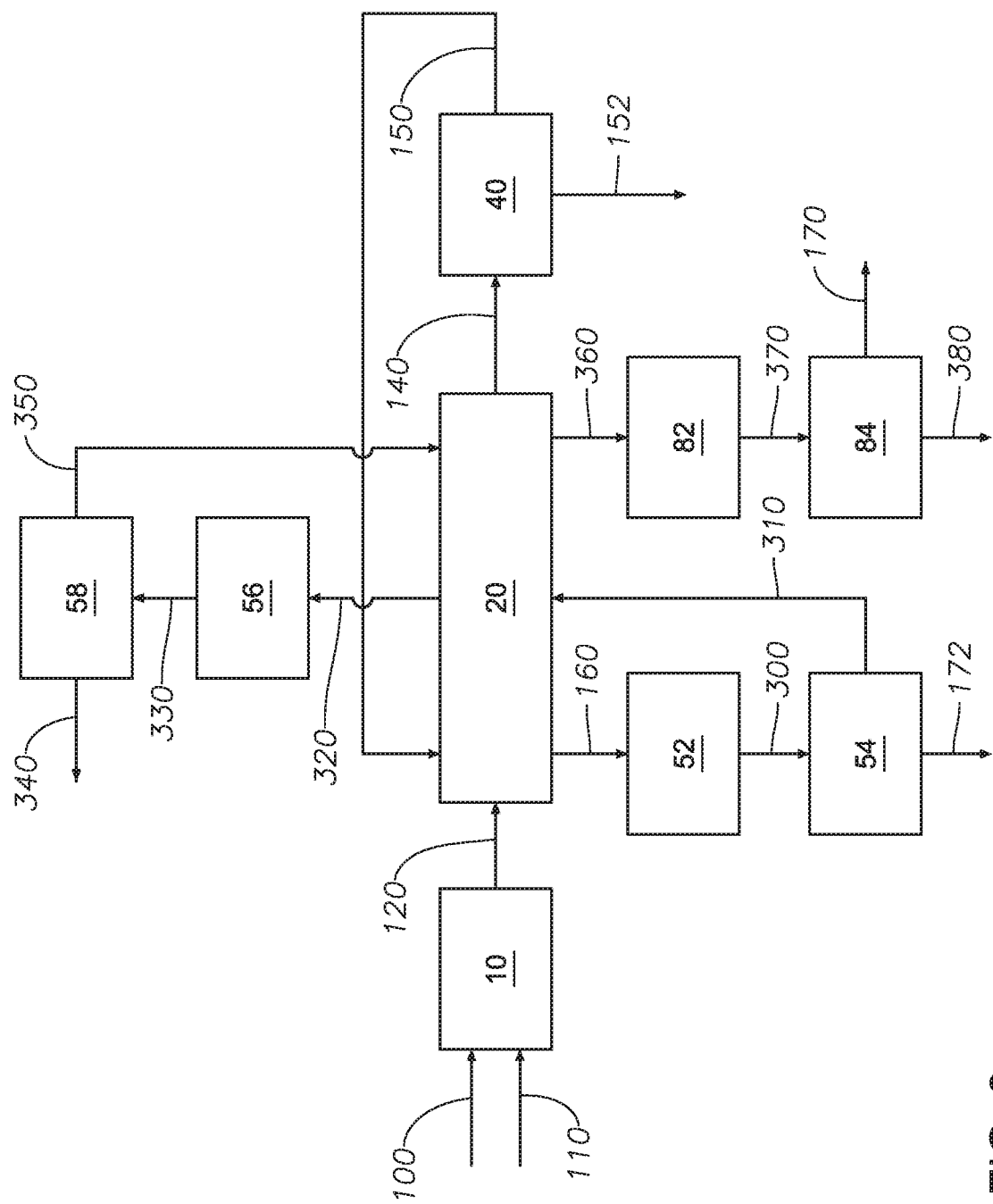
FIG. 6 is a process flow diagram of an embodiment of a heat integration process.

Referring to FIG. 6, with reference to FIG. 1 and FIG. 4, an alternate embodiment of the heat integration process is provided. In the embodiment described with reference to FIG. 6, the waste heat boiler is removed, where enough heat is removed in heating extension 20 to produce cooled effluent 140. Sufficient heat can be removed from reaction effluent 120 to increase the temperature of cooled gases stream 150 to produce hot gases stream 160, to increase the temperature of first non-condensed gases stream 310 to produce first hot non-condensables stream 320, and to increase the temperature of second non-condensed gases stream 350 to produce second hot non-condensables stream 360.

In the embodiments described with reference to FIG. 3, FIG. 4, FIG. 5, and FIG. 6, heating extension 20 can be configured such that heat exchange tubing arranged proximate to the inner wall of the reaction furnace, can be used to transport cooled gases stream 150, first non-condensed gases stream 310, and second non-condensed gases stream 350 through the heat exchanging tubing without mixing or contacting reaction effluent 120 or mixing or contacting the streams in the other heat exchanging tubing. The size and number of heat exchange tubes can be designed based on the process flow rates, the amount of heat energy that needs to be transferred to cooled gases stream 150, first non-condensed gases stream 310, and second non-condensed gases stream 350 and the size of reaction furnace 10. In embodiments where heating extension 20 is located physically inside reaction furnace 10, heating extension 20 can be designed such that reaction effluent 120 can flow around the heat exchange tubing while still allowing gas mixing in the reaction furnace.

Although the embodiments have been described in detail, it should be understood that various changes, substitutions, and alterations can be made hereupon without departing from the principle and scope. Accordingly, the scope of the embodiments should be determined by the following claims and their appropriate legal equivalents.

There various elements described can be used in combination with all other elements described here unless otherwise indicated.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed here as from about one particular value to about another particular value and are inclusive unless otherwise indicated. When such a range is expressed, it is to be understood that another embodiment is from the one particular value to the other particular value, along with all combinations within said range.

As used here and in the appended claims, the words "comprise," "has," and "include" and all grammatical variations thereof are each intended to have an open, non-limiting meaning that does not exclude additional elements or steps.

That which is claimed is:

1. A system for heat integration in a sulfur recovery unit, the system comprising:
  a reaction furnace, the reaction furnace configured to react an acid gas stream and an air stream to produce a reaction effluent, where the acid gas stream comprises hydrogen sulfide, where the air stream comprises oxygen, where the reaction effluent comprises elemental sulfur, where the hydrogen sulfide and oxygen react to produce the elemental sulfur;
  a heating extension, the heating extension fluidly connected to the reaction furnace, the heating extension configured to reduce the temperature of the reaction effluent to produce a cooled effluent;
  a sulfur condenser fluidly connected to the heating extension, the sulfur condenser configured to reduce the temperature of the cooled effluent to produce a liquid sulfur stream and a cooled gases stream, where the liquid sulfur stream comprises the elemental sulfur;
  the heating extension fluidly connected to the sulfur condenser, the heating extension configured to increase temperature of the cooled gases stream to produce a hot gases stream, where the heating extension is configured to capture heat from the reaction effluent and release the heat to the cooled gases stream;
  a first catalytic converter fluidly connected to the heating extension, the first catalytic converter configured to produce a first catalytic effluent, where the first catalytic effluent comprises elemental sulfur, where the first catalytic converter comprises a catalyst;
  a first effluent condenser fluidly connected to the first catalytic converter, the first effluent condenser configured to reduce a temperature of the first catalytic effluent to produce a sulfur stream and a first non-condensed gases stream, where the sulfur stream comprises the elemental sulfur;
  the heating extension fluidly connected to the first effluent condenser, the heating extension configured to increase a temperature of the first non-condensed gases stream to produce a first hot non-condensables stream;
  a second catalytic converter fluidly connected to the heating extension, the second catalytic converter configured to produce a second catalytic effluent, where the second catalytic effluent comprises elemental sulfur, where the second catalytic converter comprises a catalyst;
  a second effluent condenser fluidly connected to the second catalytic converter, the second catalytic converted configured to reduce the temperature of the second catalytic effluent to produce a second non-condensed gases stream and a discharge stream, where the sulfur effluent comprises the elemental sulfur;
  the heating extension fluidly connected to the second effluent condenser, the heating extension configured to increase a temperature of the second non-condensed gases stream to produce a second hot non-condensables stream;

a third catalytic converter fluidly connected to the heating extension, the third catalytic converted configured to produce a third catalytic effluent, where the third catalytic effluent comprises elemental sulfur, where the third catalytic converter comprises a catalyst; and a third effluent condenser fluidly connected to the third catalytic converter, the third effluent condenser configured to reduce the temperature of the third catalytic effluent to produce a sulfur discharge and a discharge stream, where the sulfur discharge comprises the elemental sulfur.

2. The system of claim 1, further comprising an acid gas preheater configured to increase a temperature of a pre-feed acid gas to produce the acid gas stream.

3. The system of claim 1, further comprising an air pre-heater configured to increase a temperature of a pre-feed air to produce the air stream.

4. A system for heat integration in a sulfur recovery unit, the system comprising the steps of:

a reaction furnace, the reaction furnace configured to react an acid gas stream and an air stream to produce a reaction effluent, where the acid gas stream comprises hydrogen sulfide, where the air stream comprises oxygen, where the reaction effluent comprises elemental sulfur, where the hydrogen sulfide and oxygen react to produce the elemental sulfur;

a heating extension, the heating extension fluidly connected to the reaction furnace, the heating extension configured to reduce the temperature of the reaction effluent to produce a cooled effluent;

a sulfur condenser fluidly connected to the heating extension, the sulfur condenser configured to reduce the temperature of the cooled effluent to produce a liquid sulfur stream and a cooled gases stream, where the liquid sulfur stream comprises the elemental sulfur;

the heating extension fluidly connected to the sulfur condenser, the heating extension configured to increase temperature of the cooled gases stream to produce a hot gases stream, where the heating extension is configured to capture heat from the reaction effluent and release the heat to the cooled gases stream;

a first catalytic converter fluidly connected to the heating extension, the first catalytic converter configured to produce a first catalytic effluent, where the first catalytic effluent comprises elemental sulfur, where the first catalytic converter comprises a catalyst;

a first effluent condenser fluidly connected to the first catalytic converter, the first effluent condenser configured to reduce a temperature of the first catalytic effluent to produce a sulfur stream and a first non-condensed gases stream, where the sulfur stream comprises the elemental sulfur;

the heating extension fluidly connected to the first effluent condenser, the heating extension configured to increase a temperature of the first non-condensed gases stream to produce a first hot non-condensables stream;

a second catalytic converter fluidly connected to the heating extension, the second catalytic converter configured to produce a second catalytic effluent, where the second catalytic effluent comprises elemental sulfur, where the second catalytic converter comprises a catalyst; and a second effluent condenser fluidly connected to the second catalytic converter, the second catalytic converted configured to reduce the temperature of the second catalytic effluent to produce a sulfur effluent and a discharge stream, where the sulfur effluent comprises the elemental sulfur.

5. The system of claim 4, further comprising an acid gas preheater configured to increase a temperature of a pre-feed acid gas to produce the acid gas stream.

6. The system of claim 4, further comprising an air pre-heater configured to increase a temperature of a pre-feed air to produce the air stream.

7. A system for heat integration in a sulfur recovery unit, the system comprising the steps of:

a reaction furnace, the reaction furnace configured to react an acid gas stream and an air stream to produce a reaction effluent, where the acid gas stream comprises hydrogen sulfide, where the air stream comprises oxygen, where the reaction effluent comprises elemental sulfur, where the hydrogen sulfide and oxygen react to produce the elemental sulfur;

a heating extension, the heating extension fluidly connected to the reaction furnace, the heating extension configure to reduce the temperature of the reaction effluent to produce an effluent stream;

a waste heat boiler fluidly connected to the heating extension, the waste heat boiler configured to reduce the temperature of the effluent stream to produce a cooled effluent;

a sulfur condenser fluidly connected to the waste heat boiler, the sulfur condenser configured to reduce the temperature of the cooled effluent to produce a liquid sulfur stream and a cooled gases stream, where the liquid sulfur stream comprises the elemental sulfur;

the heating extension fluidly connected to the sulfur condenser, the heating extension configured to increase temperature of the cooled gases stream to produce a hot gases stream, where the heating extension is configured to capture heat from the reaction effluent and release the heat to the cooled gases stream;

a first catalytic converter fluidly connected to the heating extension, the first catalytic converter configured to produce a first catalytic effluent, where the first catalytic effluent comprises elemental sulfur, where the first catalytic converter comprises a catalyst;

a first effluent condenser fluidly connected to the first catalytic converter, the first effluent condenser configured to reduce a temperature of the first catalytic effluent to produce a sulfur stream and a first non-condensed gases stream, where the sulfur stream comprises the elemental sulfur;

the heating extension fluidly connected to the first effluent condenser, the heating extension configured to increase a temperature of the first non-condensed gases stream to produce a first hot non-condensables stream;

a second catalytic converter fluidly connected to the heating extension, the second catalytic converter configured to produce a second catalytic effluent, where the second catalytic effluent comprises elemental sulfur, where the second catalytic converter comprises a catalyst;

a second effluent condenser fluidly connected to the second catalytic converter, the second catalytic converted configured to reduce the temperature of the second catalytic effluent to produce a second non-condensed gases stream and a discharge stream, where the sulfur effluent comprises the elemental sulfur;

the heating extension fluidly connected to the second effluent condenser, the heating extension configured to increase a temperature of the second non-condensed gases stream to produce a second hot non-condensables stream;

a third catalytic converter fluidly connected to the heating extension, the third catalytic converter configured to produce a third catalytic effluent, where the third catalytic effluent comprises elemental sulfur, where the third catalytic converter comprises a catalyst; and a third effluent condenser fluidly connected to the third catalytic converter, the third effluent condenser configured to reduce the temperature of the third catalytic effluent to produce a sulfur discharge and a discharge stream, where the sulfur discharge comprises the elemental sulfur.

8. The system of claim 7, further comprising an acid gas preheater configured to increase a temperature of a pre-feed acid gas to produce the acid gas stream.

9. The system of claim 7, further comprising an air pre-heater configured to increase a temperature of a pre-feed air to produce the air stream.

* * * * *